United States Patent [19]

Miyaji et al.

[11] Patent Number: 4,684,057
[45] Date of Patent: Aug. 4, 1987

[54] HEAT INSULATED COOKING UTENSIL

[75] Inventors: Kenichi Miyaji; Shouji Toida; Yoshinori Arai, all of Niigata, Japan

[73] Assignee: Nippon Sanso Kabushiki, Tokyo, Japan

[21] Appl. No.: 903,274

[22] Filed: Sep. 3, 1986

Related U.S. Application Data

[62] Division of Ser. No. 763,468, Aug. 7, 1985.

[30] Foreign Application Priority Data

Aug. 8, 1984 [JP] Japan ................................ 59-166018

[51] Int. Cl.4 ...................... B23K 20/02; B23K 20/14
[52] U.S. Cl. .................................. 228/187; 228/228; 228/242
[58] Field of Search ............... 228/187, 219, 221, 228, 228/238, 233, 242

[56] References Cited

U.S. PATENT DOCUMENTS 3,340,597 9/1967 Stein et al. ........................... 228/238
3,909,591 9/1975 Ulam .................................... 228/221
3,980,220 9/1976 Wolfe et al. ......................... 228/221
4,511,077 4/1985 Rummelsburg ...................... 228/228

Primary Examiner—M. Jordan
Attorney, Agent, or Firm—Scully, Scott, Murphy & Presser

[57] ABSTRACT

Disclosed is a vacuum-heat-insulated cooking utensil and a method of manufacturing the same. Inner and outer containers are prepared each having a tubular side wall and an end wall closing the end of the side wall. The inner container is positioned in the outer container with the respective bottoms being in contact with each other through a first brazing material, with the other ends of the side walls fitted to each other with a gap which constitutes a vacuum sealing section, and with an annular space being defined between the side walls. A second brazing material having a melting point higher than that of the first brazing material is positioned at the vacuum sealing section. An assembly of the containers and the brazing materials is placed in a vacuum furnace. The furnace is evacuated to evacuate the annular space. Temperature within the furnace is raised above the melting point of the second brazing material to melt the first and second brazing materials. The temperature within the furnace is then lowered to a level lower than a soldifying point of the second brazing material but higher than the melting point of the first brazing material to solidify the second brazing material to seal the vacuum sealing section. Subsequently, pressure within the furnace is raised to a level approximate to the atmospheric pressure. The temperature within the furnace is lowered to solidify the first brazing material to bring the end walls of the respective containers into intimate contact with each other to form a heat receiving bottom of the cooking utensil.

7 Claims, 7 Drawing Figures

HEAT INSULATED COOKING UTENSIL

This is a divisional of copending application Ser. No. 763,468, filed Aug. 7, 1985.

BACKGROUND OF THE INVENTION

1. Field of the Invention

The present invention relates to a vacuum-heat-insulated utensil capable of maintaining temperature of foods after heated and cooked constant, while the foods are kept contained in the cooking utensil.

2. Related Art Statement

In recent years, various kinds of vacuum-heat-insulated cooking utensils such as a pan, cookpot, kettle and the like have been proposed which are capable of maintaining temperature of foods after heated and cooked constant, in such condition that the foods are contained in the cooking utensils, without the necessity of emptying of the cooking utensils into another heat-insulated container. Such a vacuum-heat-insulated cooking utensil generally comprises a container body having a double-walled, vacuum-heat-insulating side wall structure and a heat receiving bottom.

There is known a vacuum-heat-insulated cooking utensil of the type which is manufactured by connecting first ends of a pair of cylindrical side wall members to a disc-shaped metal plate or a heat receiving member and by connecting the other ends of the side wall members together with an annular member to thereby provide an annular space between the side wall members to be evacuated. There is also known a vacuum-heat-insulated cooking utensil of the type which is manufactured by connecting a separate tubular wall member to a side wall of a cup-shaped container to form, the double walled, heat-insulating side wall structure.

However, the above-described conventional vacuum-heat-insulated cooking utensil having the inner and outer side walls integrally connected to the bottom plate has suffered from such a disadvantage that in view of the complexity in construction, the manufacturing per se of such cooking utensil would become difficult and would increase the cost. On the other hand, the cooking utensil in which the separate wall member is connected to the side wall of the container has suffered from such disadvantages that the cooking utensil would be deteriorated in design, and the joint between the separate wall member and the side wall which is to be airtight would be complicated in structure and the welding of the joint would become troublesome.

As described above, the conventional vacuum-heat-insulated cooking utensils have the problem in construction or manufacturing manner and have not yet been put into practical use and it has been desired to solve the problems.

SUMMARY OF THE INVENTION

It is therefore an object of the present invention to provide a cooking utensil having a vacuum-heat-insulating wall structure which is simple in construction and can be manufactured at relatively low costs.

It is another object of the present invention to provide a method of manufacturing such a vaccum-heat-insulated cooking utensil.

According to one aspect of the present invention, there is provided a vacuum-heat-insulated cooking utensil comprising inner and outer containers each made of metal and having a tubular side wall and an end wall closing one end of the side wall, the side wall of the outer container having an inner diameter greater than an outer diameter of the side wall of the inner container, the end wall of the inner container being brazed at an outer surface thereof to an inner surface of the end wall of the outer container in such a manner that the inner container is disposed in coaxial relation to the outer container to form an annular space between the side walls of the inner and outer containers, the other ends of the inner and outer containers being hermetically brazed to each other to close the annular space, the closed annular space being evacuated to provide a heat-insulating space.

According to another aspect of the invention, there is provided a method of manufacturing the vacuum-heat-insulated cooking utensil comprising the steps of: providing inner and outer containers each made of metal and having a tubular side wall and an end wall closing one end of the side wall, the side wall of the outer container having an inner diameter greater than an outer diameter of the side wall of the inner container; placing the inner container in the outer container in coaxial relation to provide a container assembly, with a first brazing material sandwiched between the end walls of the inner and outer containers and with a second brazing material disposed between the side walls adjacent to the other ends thereof, an annular space being formed between the side walls, the second brazing material having a melting point higher than that of the first brazing material, the other ends of the side walls being spaced from each other a predetermined distance to provide an evacuation gap; placing the container assembly in a vacuum chamber with an axis thereof disposed vertically and with the other ends of the side walls disposed at a level lower than the end walls; evacuating the vacuum chamber to evacuate the annular space through the evacuation gap; subsequently heating the container assembly in the vacuum chamber to a temperature to melt the first and second brazing materials, so that the molten first brazing material is filled in a space formed between the end walls and that the molten second brazing material flows into the evacuation gap; subsequently cooling the vacuum chamber to a temperature to solidify the molten second brazing material to close the evacuation gap; and subsequently increasing pressure in the vacuum chamber to such a level to move the end walls toward each other and cooling the vacuum chamber to a temperature to solidify the molten first brazing material.

DETAILED DESCRIPTION OF THE PREFERRED EMBODIMENT

Figure 1:
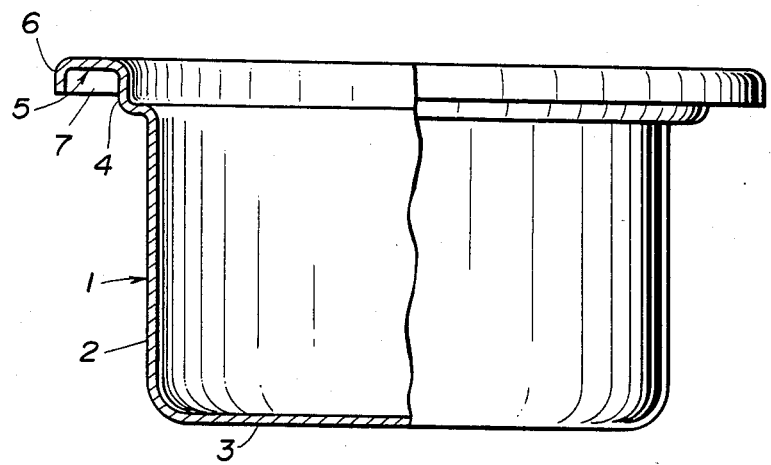
FIG. 1 is a partially cross-sectional front elevational view showing components to be assembled into a vacuum-heat-insulated cooking utensil according to the present invention.
Figure 1:
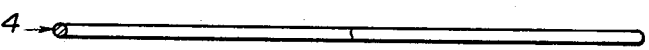
Figure 1:
Figure 1:
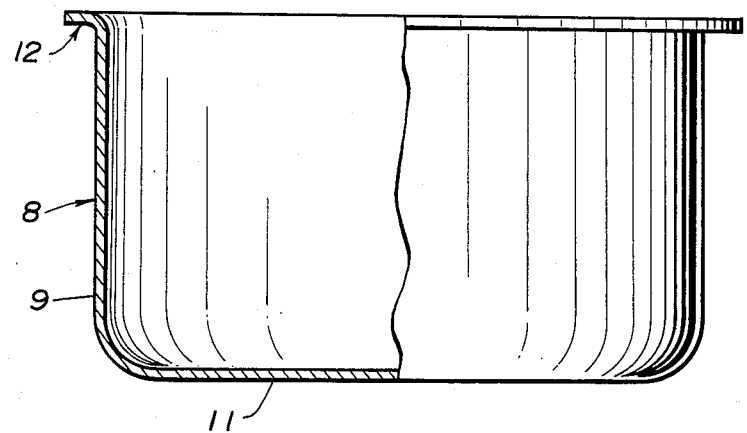

FIG. 1 shows components to be prepared to manufacture a vacuum-heat-insulated cooking utensil in accordance with the present invention. The components include an inner container, generally designated by the reference character 1, which is made of a metal such as stainless steel or the like and has a tubular or cylindrical side wall 2 and an end wall or bottom 3 closing one end of the side wall 2. The side wall 2 has the other end enlarged in diameter to form an enlarged diameter portion 4 of a predetermined depth which defines a mouth of the inner container 1. An annular flange (first flange), generally designated by the reference numeral 5, extends radially outwardly a predetermined distance from a free end of the enlarged diameter portion 4, and has an outer peripheral portion 6 extending downwardly to define a annular recess 7.

An outer container, generally designated by the reference numeral 8, is made of a metal such as stainless steel or the like, and has a tubular or cylindrical side wall 9 and an end wall or bottom 11 closing one end of the cylindrical side wall 9. An annular flange 12 (second flange) extends radially outwardly from the other end of the cylindrical side wall 9, which other end defines a mouth of the outer container 8. The side wall 9 has an inner diameter which allows the enlarged diameter portion 4 of the inner container 1 to be fitted with a small gap into the side wall 9. In other words, the inner diameter of the side wall 9 is slightly greater than the outer diameter of the enlarged diameter portion 4. The flange 12 has a radial extent capable of being loosely fitted in the recess 7. The outer container 8 has a depth substantially equal to that of the inner container 1.

A first brazing material 13 is prepared to braze the end walls 3 and 11 of the respective inner and outer containers 1 and 8 to each other. The first brazing material 13 consists of a silver brazing filler metal or the like and is in the form of a thin disc having a diameter substantially equal to the diameter of the end wall 3 of the inner container 1. A second brazing material 14 is prepared to seal in a gas-tight manner an evacuation gap or a vacuum sealing section 15 (cf. FIG. 2) at the mouths of the respective inner and outer containers 1 and 8. The second brazing material 14 consists of a silver brazing filler metal or the like having a melting point higher than that of the first brazing material 13, and is in the form of a ring having an outer diameter substantially equal to the inner diameter of the side wall 9 of the outer container 8. Preferably, the first brazing material 13 has a greater thermal conductivity than the second brazing material 14.

An example of a manufacturing method of the vacuum-heat-insulated cooking utensil, using the above-described components, will now be described with reference to FIGS. 2 to 4.

Figure 2:
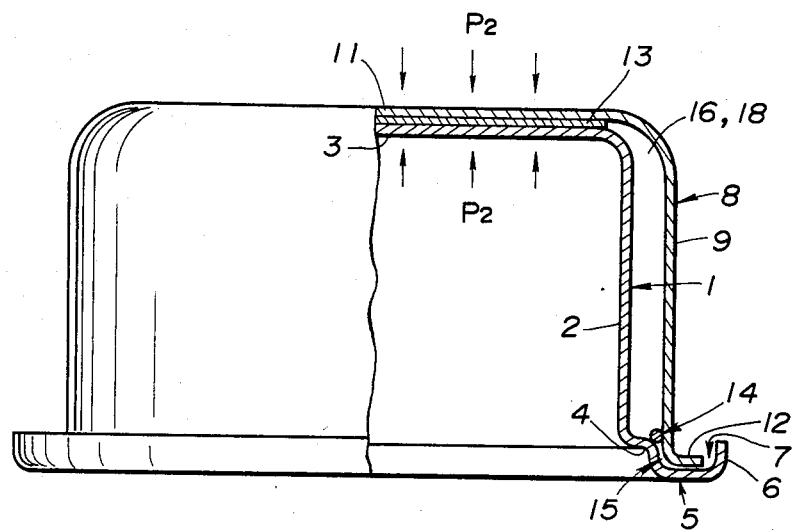
FIG. 2 is a partially cross-sectional front elevational view showing the assembly of the components shown in FIG. 1.

The inner container 1 is first placed on a surface (not shown) with the mouth thereof facing downwardly, as shown in FIG. 2. The first brazing material 13 is then placed on the end wall 3 of the inner container 1, and the second brazing material 14 in the form of a ring is placed on the enlarged diameter portion 4 of the side wall 2 with the remaining portion of the side wall 2 extending therethrough. The outer container 8 is then put on the inner container 1 from the above such that the flange 12 of the outer container 8 is fitted into the recess 7 defined by the expanded portion 4 and the flange 5 to fix the outer container 8 to the inner container 1 and to define an annular space 16 between the side walls 2 and 9 of the respective inner and outer containers 1 and 8. In this case, the first brazing material 13 is sandwiched between the bottoms 3 and 11, so that a small gap is formed between the flange 12 and the bottom of the recess 7. Also, an annular gap is formed between the outer surface of the enlarged diameter portion 4 and the inner surface of the side wall 9 since the inner diameter of the side wall 9 is slightly greater than the outer diameter of the enlarged diameter portion 4 of the side wall 2, and the second brazing material 14 lies along an upper end of the annular gap. The annular space 16 therefore communicates with the exterior of the thus assembled inner and outer containers 1 and 8 through the annular gap formed between the enlarged diameter portion 4 and the side wall 9 and through the gap existing between the flange 12 and the bottom of the recess 7. These two gaps constitute the evacuation gap or the vacuum sealing section 15.

Figure 3:
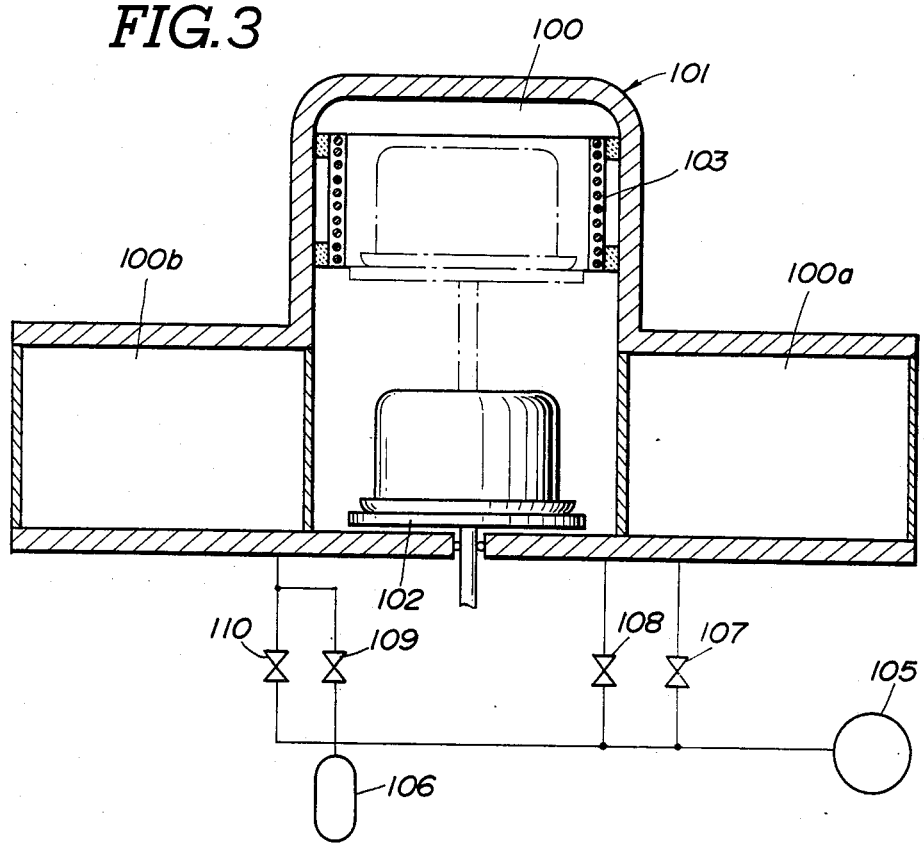
FIG. 3 is a cross-sectional front elevational view of a vacuum furnace in which the assembly shown in FIG. 2 is placed.

Subsequently, the assembly of the inner and outer containers 1 and 8 with the first and second brazing materials 13 and 14 being located in their respective positions is put in a chamber 100 of a vacuum furnace 101, as shown in FIG. 3, through a first air lock chamber 100a thereof. The vacuum furnace 101 has a vertically movable table 102 on which the assembly is placed, an electric heater 103 of a cylindrical shape, and a second air lock chamber 100b through which the processed assembly is taken out. The table 102 is moved upwardly to the position where the assembly is entirely surrounded by the heater 103, when it is desired to heat the assembly. The vacuum furnace 101 also comprises a vacuum pump 105, a gas source 106 of an inert gas such as nitrogen, argon or the like, control valves 107 to 110, and a control circuit (not shown) which controls the vacuum pump 105, the control valves 107 to 110 and the electric heater 103.

Figure 4:
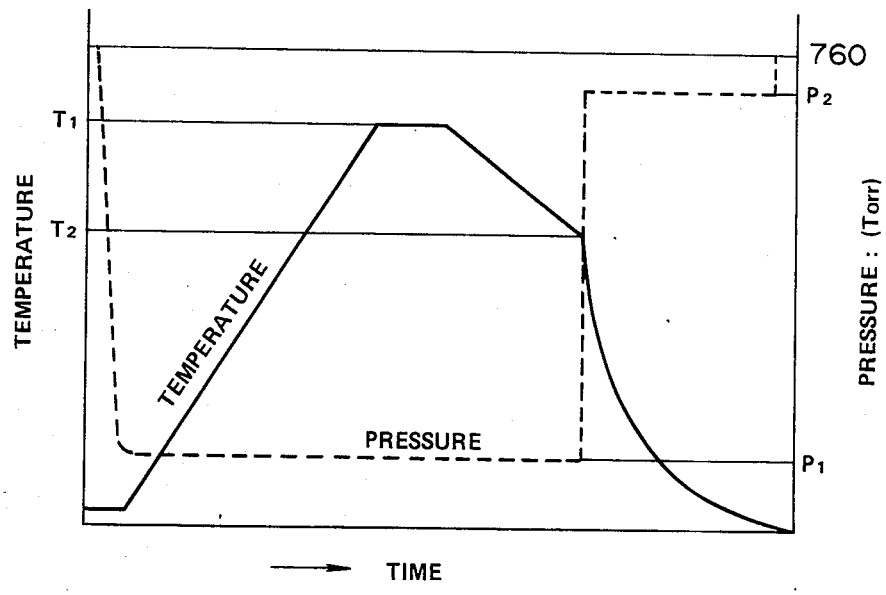
FIG. 4 is a graph showing changes in temperature and pressure within a vacuum chamber of the vacuum furnace of FIG. 3 when the manufacturing method in accordance with the present invention is carried out.

FIG. 4 shows changes in pressure and temperature, to which the assembly within the vacuum furnace 101 is subjected, over time. As indicated by a broken line in FIG. 4, the chamber 100 is first evacuated to decrease the pressure therein to a level P1. It is desirable that the pressure P1 is below $1 \times 10^{-2}$ Torr. This allows the annular space 16 to be evacuated through the vacuum sealing section 15 to decrease the pressure within the space 16 to a level equal to the pressure P1.

After the interior of the chamber 100 has been sufficiently evacuated, the table 102 is lifted to move the assembly into the heater 103 and then the heater 103 is energized to raise the temperature of the assembly to a level T1, as indicated by a solid line in FIG. 4, which is higher than the melting point of the second brazing material 14, while maintaining the pressure within the chamber 100 at the pressure P1. This causes the first and second brazing materials 13 and 14 to be melted so that the molten second brazing material 14 flows into the vacuum sealing section 15. The temperature of the assembly is maintained at the level T1 for a predetermined time duration, to allow the molten second brazing material 14 to become sufficiently intimate with the wall surfaces of the mouths of the respective inner and outer containers 1 and 8, within the vacuum sealing section 15.

Subsequently, while still maintaining the pressure within the chamber 100 at the level P1, the heater 103 is deenergized and the table 102 is lowered to its original position. Then, the assembly is moved into the second air lock chamber 100b which is now under the pressure of P1. This causes the temperature of the assembly to be gradually lowered to a level T2 which is lower than a solidifying point of the second brazing material 14 but higher than the melting point of the first brazing material 13. Consequently, the second brazing material 14 is solidified to seal the vacuum sealing section 15, so that the annular space 16 is formed into a vacuum insulating space 18.

After the second brazing material 14 has been sufficiently solidified and the brazing of the vacuum sealing section 15 has been completed, the inert gas is introduced, by opening the valve 109, into the second air lock chamber 100b to raise the pressure therein to a level P2 which is approximate to the atmospheric pressure. This causes the heated and hence softened end walls 3 and 11 of the inner and outer containers 1 and 8 to be deformed so as to be moved toward each other, so that the interface between the end walls 3 and 11 is filled with the molten first brazing material 13 with a minimum of gap, and an excess brazing material is forced out of the interface between the end walls 3 and 11 toward the vacuum-heat-insulating space 18. Also, when the inert gas is introduced into the second air lock chamber 100b, the temperature of the assembly is rapidly lowered to the normal temperature under the influence of the inert gas. As a result, the first brazing material 13 closely filled in the interface between the end walls 3 and 11 is solidified with the lapse of time, so that the end walls 3 and 11 are closely joined to each other into a unit. The thus processed assembly of the inner and outer containers 1 and 8 is then taken out from the second air lock chamber 100b of the vacuum furnace 101.

Figure 5:
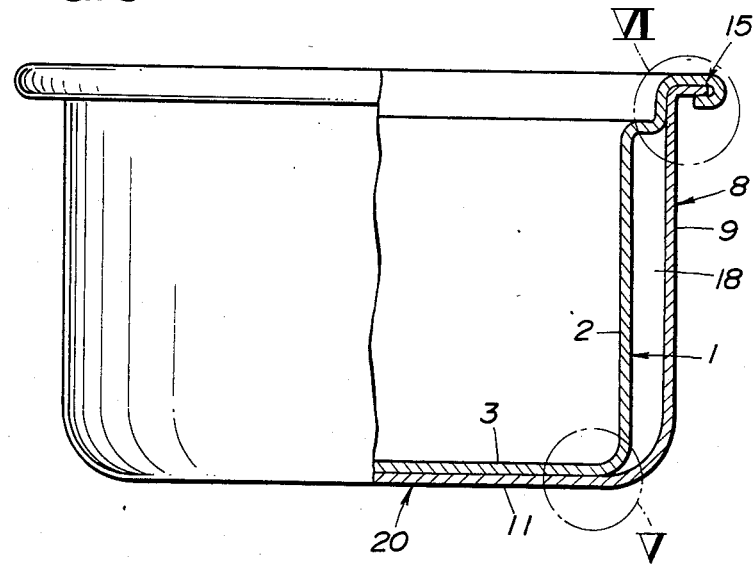
FIG. 5 is a partially cross-sectional front elevational view showing the vacuum-heat-insulated cooking utensil manufactured by the method according to the present invention.
Figure 6:
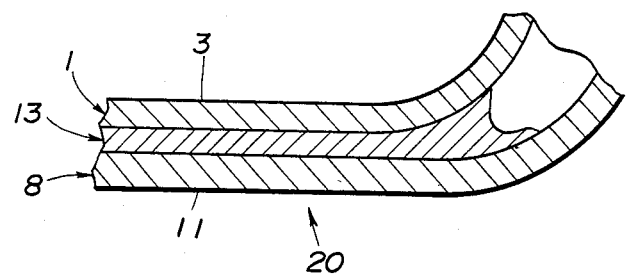
FIG. 6 is a fragmentary enlarged cross-sectional view showing a portion encircled by the character V in FIG. 5.
Figure 7:
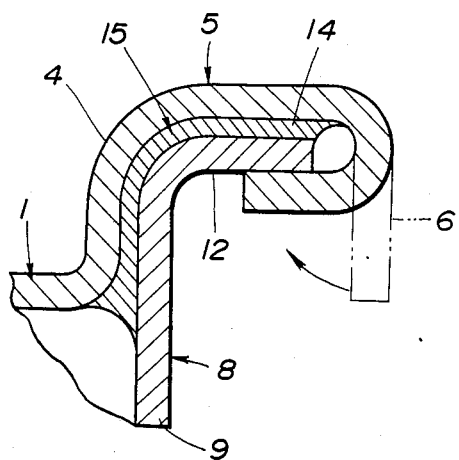
FIG. 7 is a fragmentary enlarged cross-sectional view showing a portion encircled by the character VI in FIG. 5.

According to the above-described steps, the vacuum-heat-insulated cooking utensil is manufactured comprising the inner and outer containers 1 and 8 which, as shown in FIGS. 5 to 7, have the annular vacuum-heat-insulating space 18 formed between the side walls 2 and 9, and have the end walls 3 and 11 intimately joined to each other to form a heat receiving bottom 20 of the cooking utensil. In the thus manufactured vacuum-heat-insulated cooking utensil, as shown in FIG. 6, the end walls or bottoms 3 and 11 of the inner and outer containers 1 and 8 are closely joined to each other by the first brazing material 13. Finally, as shown in FIG. 7, the downwardly extending outer peripheral portion 6 of the flange 5 which is shown by the phantom line in FIG. 7 at the mouths of the respective inner and outer containers 1 and 8, is bent radially inwardly and is pressed against the flange 12 by an appropriate press (not shown). Thus, all of the manufacturing steps are completed.

According to the above-described manufacturing method of the vacuum-heat-insulated cooking utensil, the forming of the vacuum heat insulating space 18, the sealing of the vacuum sealing section 15 and the forming of the heat receiving bottom 20 can be performed subsequently and at once, so that the manufacturing is extremely facilitated. In addition, a great number of cooking utensils can be manufactured at a time, so that it is possible to reduce the manufacturing cost. Moreover, since the brazing of the vacuum sealing section 15 and the heat receiving bottom 20 is performed under vacuum, a fear is minimized that voids are developed in the brazing, which has conventionally often become an issue in the brazing within the atmosphere, so that there is provided a brazing superior in quality. Furthermore, since the end walls 3 and 11 of the inner and outer containers 1 and 8 are pressed against each other from the outside and are intimately joined to each other in unit when the heat receiving bottom 20 is formed, the first brazing material 13 is spread between the end walls 3 and 11 and is well diffused and, therefore, it is possible to further ensure the brazing.

Although the embodiment has been described as utilizing the first brazing material 13 in the form of a thin disc and the second brazing material 14 in the form of a ring, the present invention should not be limited to this embodiment. Brazing material in the form of a foil or paste, for example, may be used as the first brazing material 13, and brazing material in the form of a wire, a rod, granule having a particle size greater than the gap of the vacuum sealing section, paste or the like, for example, may be used as the second brazing material 14. Furthermore, the brazing materials 13 and 14 should not be limited only to the silver brazing filler metal, but may be suitably selected, dependent upon the material of the containers, temperature condition and the like, from a group consisting of manganese copper, phosphorous copper, nickel, palladium, aluminum brazing filler metals and the like which contain no components relatively high in vapor pressure.

When the first brazing material 13 is in the form of paste, is selected, the surface of the end wall 3 (see FIG. 2) should be uniformly coated with the brazing material 13 before putting the outer container 8 on the inner container 1. Also, when the second brazing material 14 is in the form of powder or granules, the second brazing material 14 should be uniformly distributed over the upper surface of the enlarged diameter portion 4 (see FIG. 2); and when the second brazing material 14 is in the form of paste, the upper surface of the enlarged diameter portion 4 should be uniformly coated with the second brazing material 14.

Additionally, although the above-described vacuum-heat-insulated cooking utensil has such a construction that the vacuum sealing section 15 is formed between the mouths of the respective inner and outer containers 1 and 8, the present invention should not be limited to this construction. For example, the mouths of the respective inner and outer containers 1 and 8 may previously be hermetically joined together by welding or the like, and a vacuum sealing section similar in function to the sealing section 15 may be provided in the side wall 2 and/or the side wall 9. The vacuum sealing section may be a hole formed through the side wall 2 or 9 which is closed by the second brazing material. Even in this case, similar function and advantages can be obtained.

What is claimed is:
1. A method of manufacturing a vacuum-heat-insulated cooking utensil comprising the steps of:
providing inner and outer container each made of metal and having a tubular side wall and an end wall closing one end of said side wall, the side wall of said outer container having an inner diameter greater than an outer diameter of the side wall of said inner container;

placing said inner container in said outer container in coaxial relation to provide a container assembly, with a first brazing material sandwiched between said end walls of said inner and outer containers and with a second brazing material disposed between said side walls adjacent to other ends thereof, an annular space being formed between said side walls, said second brazing material having a melting point higher than that of said first brazing material, said other ends of said side walls being spaced from each other a predetermined distance to provide an evacuation gap;

placing said container assembly in a vacuum chamber with an axis thereof disposed vertically and with said other ends of said side walls disposed at a level lower than said end walls;

evacuating said vacuum chamber to evacuate said annular space through said evacuation gap;

subsequently heating said container assembly in said vacuum chamber to a temperature to melt said first and second brazing materials, so that the molten first brazing material fills a space formed between said end walls and so that the molten second brazing material flows into said evacuation gap;

subsequently cooling said container assembly to a temperature to solidify said molten second brazing material to close said evacuation gap; and subsequently cooling said container assembly to a temperature to solidify said molten second brazing material to close said evacuation gap; and subsequently increasing pressure in said vacuum chamber to such a level to move said end walls toward each other and cooling said container assembly to a temperature to solidify said molten first brazing material.

2. A method of manufacturing a vacuum-heat-insulated cooking utensil according to claim 1, wherein said step of increasing the pressure in said vacuum chamber and cooling the container assembly includes the step of introducing an inert gas into said vacuum chamber.

3. A method of manufacturing a vacuum-heat-insulated cooking utensil according to claim 1, wherein each of said first and second brazing material is selected from a group consisting of silver, manganese copper, phosphorous copper, nickel, palladium and aluminum brazing materials.

4. A method of manufacturing a vacuum-heat-insulated cooking utensil according to claim 1, wherein said first brazing material has a greater thermal conductivity than that of said second brazing material.

5. A method of manufacturing a vacuum-heat-insulated cooking utensil according to claim 1, wherein said first brazing material is in the form of a disc having a diameter substantially equal to that of the end wall of said inner container.

6. A method of manufacturing a vacuum-heat-insulated cooking utensil according to claim 1, wherein the side wall of said inner container is enlarged in diameter at that portion thereof adjacent to said other end of the side wall of said inner container to provide an enlarged diameter portion, the outer diameter of said enlarged diameter portion being slightly less than the inner diameter of the side wall of said outer container, said other ends of the side walls of said inner and outer containers being formed respectively into first and second peripheral flanges directed radially outwardly, said evacuation gap being formed between said enlarged diameter portion and the side wall of said outer container and between said first and second flanges.

7. A method of manufacturing a vacuum heat-insulated cooking utensil according to claim 6, wherein said second brazing material is in the form of a ring having an outer diameter substantially equal to the inner diameter of the side wall of said outer container.

* * * * *